United States Patent
Wilson et al.

(10) Patent No.: US 6,439,090 B1
(45) Date of Patent: Aug. 27, 2002

(54) METHOD FOR REMOVING WASTE MATERIAL FROM AN ANNULAR, ELASTOMERIC ARTICLE

(75) Inventors: Brian Joseph Wilson, Akron; Kenneth Dean Conger, Stow; Scott Richard Harshbarger, Copley; William Allen Rex, Doylestown, all of OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/501,016

(22) Filed: Feb. 9, 2000

(51) Int. Cl.⁷ .................................................. B26D 7/14
(52) U.S. Cl. ................................ 83/18; 83/176; 83/914; 83/951
(58) Field of Search .......................... 83/18, 17, 175, 83/176, 914, 923, 951; 82/101

(56) References Cited

U.S. PATENT DOCUMENTS

| | | | | |
|---|---|---|---|---|
| 1,206,946 A | * | 12/1916 | Tscherne | 83/176 |
| 1,214,295 A | * | 1/1917 | Gammeter | 83/17 |
| 1,273,526 A | * | 7/1918 | Nall | 82/101 |
| 1,314,029 A | * | 8/1919 | Townsend | 82/101 |
| 1,721,298 A | * | 7/1929 | Haase | 82/101 |
| 1,994,178 A | * | 3/1935 | Raiche | 83/176 |
| 2,036,787 A | * | 4/1936 | Zabriskie | 83/176 |
| 2,293,721 A | * | 8/1942 | Engler | 83/176 |
| 2,866,501 A | * | 12/1958 | George | 83/17 |
| 3,454,690 A | * | 7/1969 | Anderson et al. | 83/17 |
| 3,461,756 A | * | 8/1969 | Mojonnier | 83/17 |
| 3,545,321 A | * | 12/1970 | Phelps et al. | 82/101 |
| 3,903,948 A | | 9/1975 | Christie et al. | 157/13 |
| 4,158,417 A | * | 6/1979 | Inoue | 83/18 |
| 4,181,482 A | | 1/1980 | Grawey et al. | 425/28 R |
| 4,181,488 A | | 1/1980 | Grawey et al. | 425/577 |
| 4,249,882 A | | 2/1981 | Koch et al. | 425/547 |
| 4,326,325 A | * | 4/1982 | Chambers et al. | 82/101 |
| 4,617,849 A | * | 10/1986 | Ligon | 83/18 |
| 4,960,022 A | * | 10/1990 | Chuang | 83/175 |
| 4,995,286 A | * | 2/1991 | Kobayashi et al. | 82/101 |
| 4,997,329 A | * | 3/1991 | Hanamoto et al. | 83/402 |
| 5,069,594 A | * | 12/1991 | Bott et al. | 83/176 |
| 5,304,050 A | | 4/1994 | Vismara | 425/4 R |
| 5,372,672 A | * | 12/1994 | Seifert et al. | 83/18 |
| 5,505,603 A | | 4/1996 | Baracchi et al. | 425/127 |
| 5,699,706 A | * | 12/1997 | Rode | 83/18 |
| 6,086,295 A | * | 7/2000 | Novak et al. | 83/914 |
| 6,142,044 A | * | 11/2000 | Freund et al. | 82/1.11 |

* cited by examiner

*Primary Examiner*—Kenneth E. Peterson
*Assistant Examiner*—Stephen Choi
(74) *Attorney, Agent, or Firm*—Nancy T. Krawczyk

(57) ABSTRACT

A method of removing waste material from an annular, elastomeric article 10. The method includes the steps of: securing at least a portion of the annular, elastomeric article 10; securing at least a portion of the waste material; penetrating the waste material with a cutting tool 52; and guiding the cutting tool 52 through the waste material. The method is characterized by the step of stretching the waste material prior to guiding the cutting tool 52. In the preferred method, the waste material is stretched a distance sufficient to simultaneously apply some degree of tension to the unsecured portions of the waste material.

3 Claims, 7 Drawing Sheets

METHOD FOR REMOVING WASTE MATERIAL FROM AN ANNULAR, ELASTOMERIC ARTICLE

TECHNICAL FIELD

This invention relates to a method for removing waste material from an annular, elastomeric article. More particularly, this invention relates to a method for removing a gate from a tire bead apex assembly.

BACKGROUND ART

The use of molded articles has become increasingly common in many industries. In the tire industry, better compounding has resulted in the ability to better adhere molded, precured articles with uncured elastomers. This advance allows tire manufacturers to mold and precure certain components of a tire prior to assembly of the tire on a building drum. One such component is the tire bead apex assembly. Prior to molding and precuring the tire bead apex assembly, the rubber portions of the assembly were made of unvulcaned rubber. Due to the relative thickness of each component, extra curing time was required to cure the rubber of these components. This extra curing time has been eliminated with the use of molded and precured assemblies.

In addition to lowering the curing time of the tire, the use of a precured tire bead apex assembly provides additional benefits. An uncured tire bead apex assembly will likely distort during the tire building process, during transportation of the tire to the curing press, and while curing. By precuring the tire bead apex assembly, better uniformity is achieved. Since a precured tire bead apex assembly will not distort, the use of precured assemblies allows tire builders to accurately place ply ends and to determine a precise ply path around the assembly.

Since the use of a precured tire bead apex assembly provides many advantages, there is a need to mass-produce these assemblies. Molding and precuring large amounts of these assemblies can easily be done with the proper injection molding machines; however, a problem occurs in readying these assemblies for use in a tire. After molding the article, the article generally has waste material attached to it. For example, when the precured tire bead apex assembly is removed from the injection molding machine, the assembly has a gate attached to it. The gate is a ring of cured rubber waste produced during the injection molding process. The tire bead apex assembly cannot be used in a tire until this waste material is removed.

The gate on an injection molded tire bead apex assembly may extend inward from the bead portion of the assembly. When mounted in a tire, the bead portion of the assembly is located radially inwardly of the apex portion of the assembly. The gate on the injection molded tire bead apex assembly is large enough to make removal difficult. A typical gate can have a thickness of approximately one-eighth of an inch (3.175 mm) and can extend approximately one inch (25.4 mm) from the bead portion of the assembly around the entire circumference of the assembly. Each gate may have a plurality of sprues that extend from the gate surface. The sprues are cured rubber waste from rubber left in the runners of the injection molding machine. Since the sprues are part of the gate, they are removed from the tire bead apex assembly when the gate is removed.

In some applications, more generally with small injection molded articles, the waste material is torn off of the article when the article is removed from the mold. This generally occurs when the waste material is very thin and can easily and cleanly be torn off of the injection molded article. With larger articles, such as the tire bead apex assembly, an additional process step is needed to remove the waste material.

The current method of removing a gate from an injection molded tire bead apex assembly is to remove the gate by hand. After the gate is removed from the mold, it is manually hung on a hook by its inside diameter, the bead portion. An operator then manually removes the gate with a cutting tool, such as a razor blade. Manual removal of the waste material becomes very expensive and inefficient when large quantities of articles are manufactured. Manual removal of the waste material also leads to non-uniformity arising from the difficulty in assuring a clean and uniform cut along the entire edge of the article. Additionally, if the cut is too close to the article, the article can be damaged, and if the cut is not close enough to the article, portions of the waste material remain on the article.

SUMMARY OF THE INVENTION

This invention relates to a method for removing waste material from an annular, elastomeric article. The method includes the steps of: securing at least a portion of the annular, elastomeric article; securing at least a portion of the waste material; penetrating the waste material with a cutting tool; and guiding the cutting tool through the waste material. The method is characterized by the step of stretching the waste material prior to guiding the cutting tool.

Definitions

For ease of understanding this disclosure, the following terms are defined. "Apex" means an elastomeric filler located radially above the bead core and between the plies and the turnup ply.

"Bead" means that part of the tire comprising an annular tensile member wrapped by ply cords and shaped to fit the design rim.

"Bead toe" means that portion of the bead which joins the bead base at the inside surface of the tire.

"Bead heel" means that portion of the bead which joins the bead base at the outer surface of the tire near the rim flange.

"Ply," unless otherwise specified, means a continuous layer of rubber-coated parallel cords.

"Radial" and "radially" are used to mean directions radially toward or away from the axis of rotation of the tire.

BRIEF DESCRIPTION OF DRAWINGS

The invention will be described by way of example and with reference to the accompanying drawings in which.

DETAILED DESCRIPTION OF THE INVENTION

Figure 1:
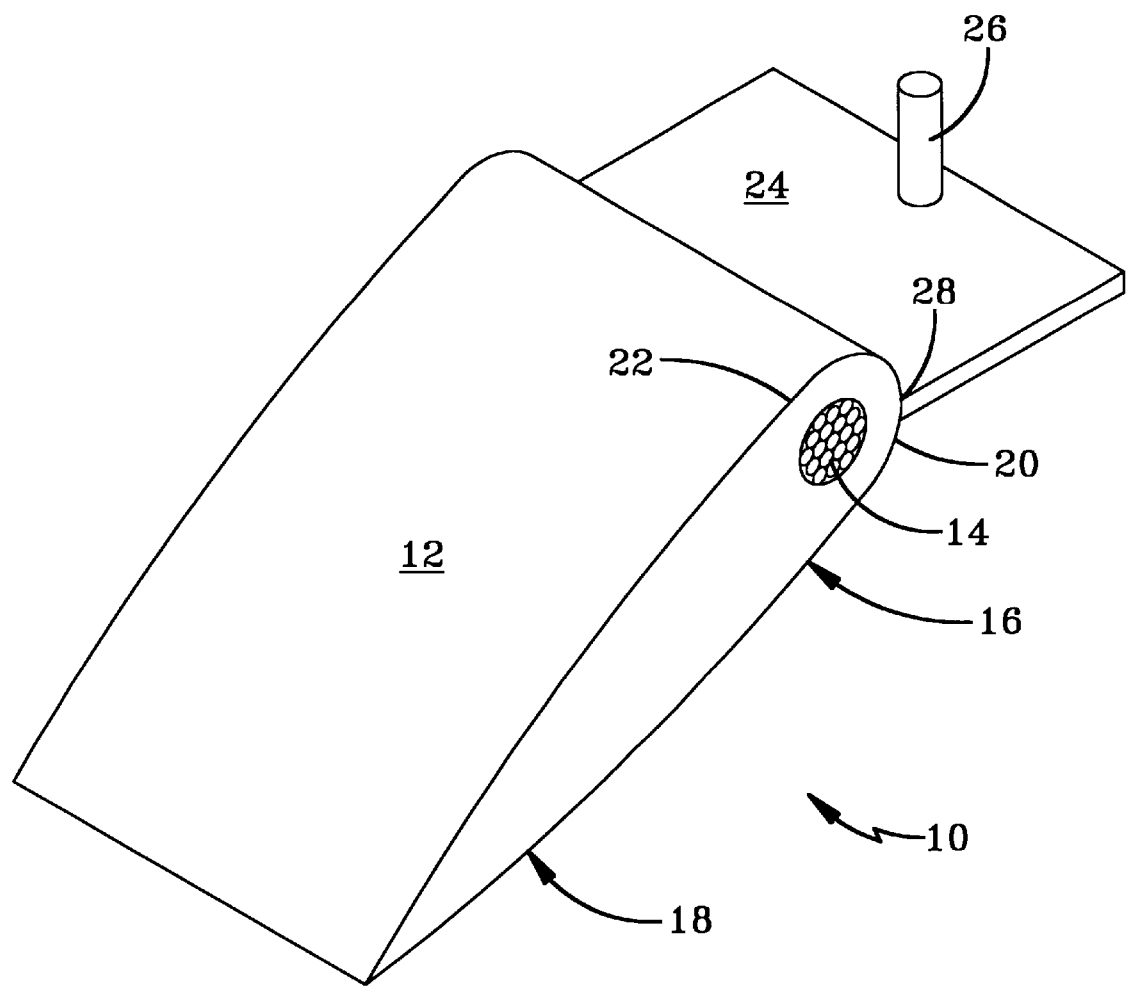
FIG. 1 is a cross-sectional view of a portion of an annular, elastomeric article prior to removal of the waste material.

FIG. 1 is a cross-sectional view of a portion of an annular, elastomeric article 10 prior to removal of the waste material.

The article 10 depicted is a portion of a tire bead apex assembly 12. The bead 14 is located in the bead portion 16 of the assembly 12. The bead portion 16 of the assembly 12 is located radially inwardly of the apex portion 18 of the assembly 12. The bead portion 16 has a bead toe side 20 and a bead heel side 22. The waste material, a gate 24, extends from the bead toe side 20 of the assembly 12 and extends at least partially in a radially inwardly direction. The waste material depicted in FIG. 1 has a sprue 26 which represents a plurality of sprues 26 that are positioned around the circumference of the waste material. In order for the tire bead apex assembly 12 to be used in a tire, the waste material must be removed from the assembly 12 along an edge 28 of the assembly 12. Generally, the waste material is annular in shape and extends completely around the circumference of the annular, elastomeric article 10.

Figure 2:
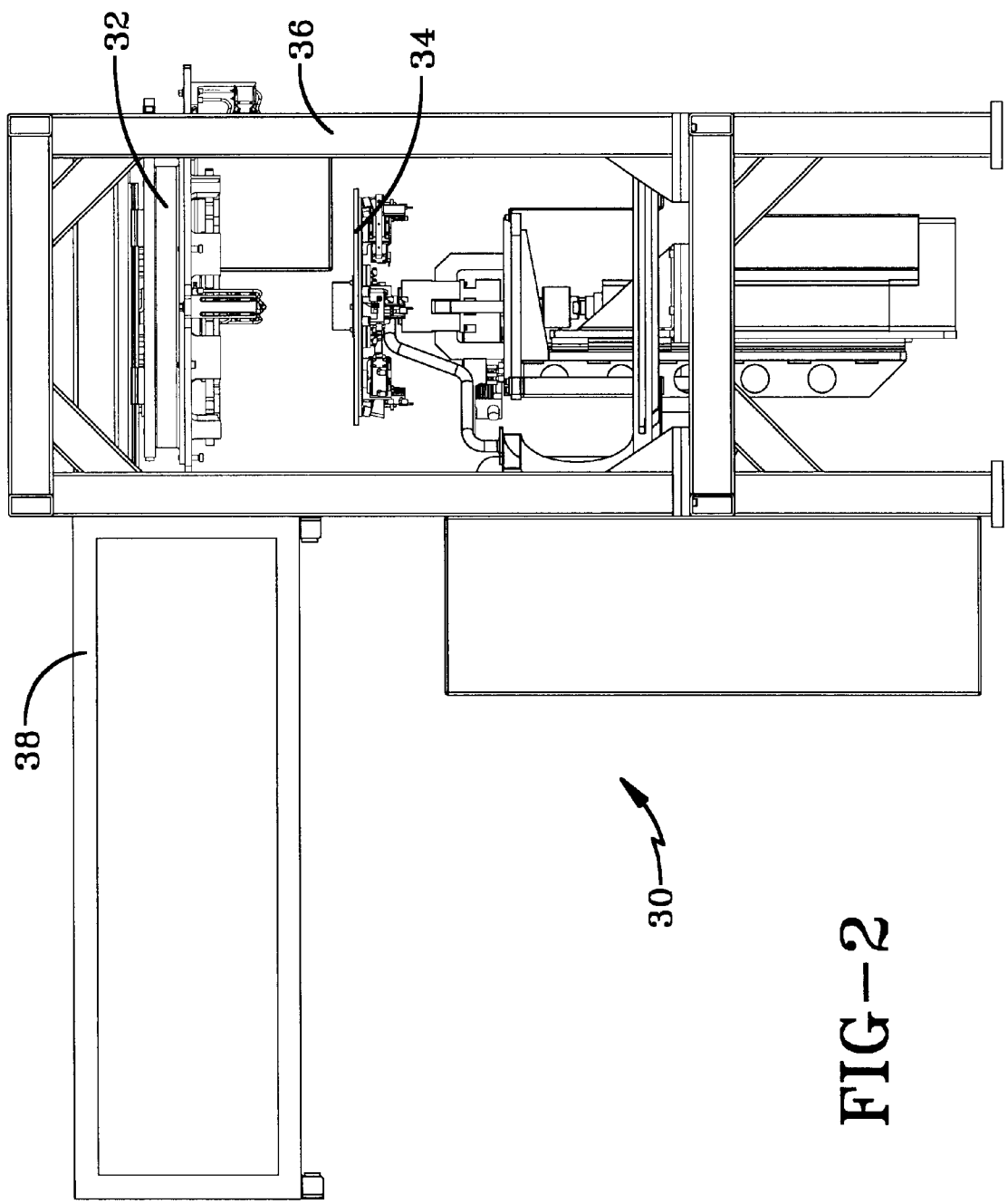
FIG. 2 is a side view of an apparatus used to perform the method of the invention.

FIG. 2 shows a side view of an apparatus 30 for removing the waste material from the annular, elastomeric article 10. The apparatus 30 has a frame 36 which supports both a first tooling assembly 32 and a second tooling assembly 34. The first tooling assembly 32 is mounted on at least one rail 38. The rail 38 extends out a side of the apparatus 30 to a position above a disposal area, such as a trash can or a recycling bin. The first tooling assembly 32 can be shuttled on the rail 38 between a position in the center of the apparatus 30 and a position external to the frame 36 on the extension of the rail 38. When positioned for the removal of the waste material, the first tooling assembly 32 is centered in the apparatus 30. When the first tooling assembly 32 is centered in the apparatus 30, the center of the first tooling assembly 32 is directly above the center of the second tooling assembly 34.

The apparatus 30 has at least a portion of a first mechanism and a second mechanism. The first mechanism is used to secure at least a portion of the annular, elastomeric article 10. In the preferred method, at least of portion of each third of the article 10 is simultaneously secured. Each third consists of a separate 120 degree section of the article 10. The second mechanism is used to secure at least a portion of the waste material. If the waste material extends around the entire circumference of the article 10, it is preferred to simultaneously secure at least a portion of each third of the waste material.

Figure 3:
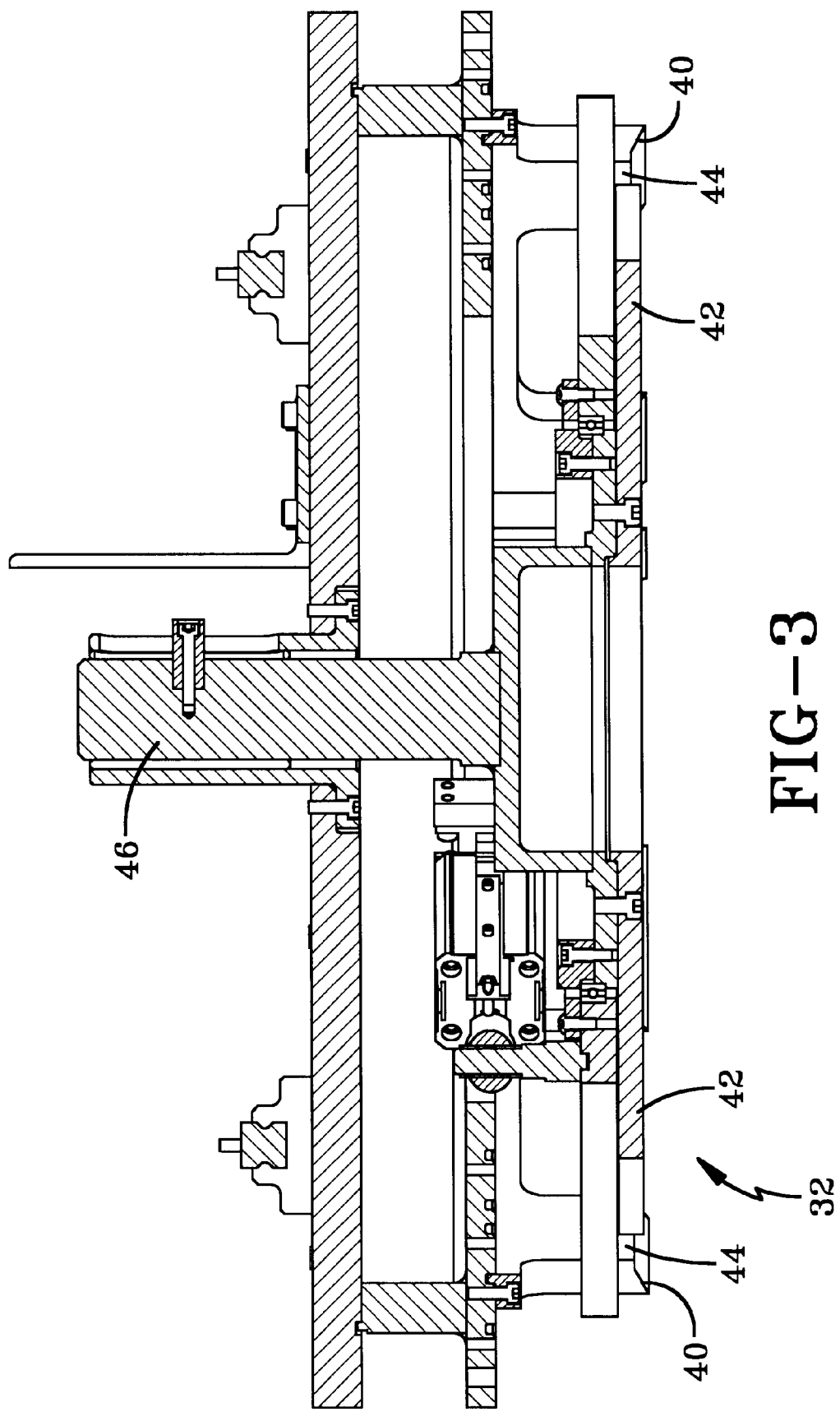
FIG. 3 is a side view of the first tooling assembly of the apparatus shown in FIG. 2.

FIG. 3 shows a detailed side view of the first tooling assembly 32. In this embodiment of the apparatus 30, the first tooling assembly 32 contains a portion of both the first mechanism and the second mechanism. The portion of the first mechanism located on the first tooling assembly 32 is a register surface 40. The portion of the second mechanism located on the first tooling assembly 32 is the first clamp plate 42. The register surface 40 is separated from the first clamp plate 42 by an open space 44. The first clamp plate 42 is connected to a cylinder 46 which allows the first clamp plate 42 to move inwardly toward the cylinder 46. The cylinder 46 limits the amount of movement with the use of a spring, an pneumatic cylinder, or a similar device.

The first and second mechanisms can have different embodiments, including jaws located entirely on one of the tooling assemblies 32, 34, for securing the article 10 and the waste material, respectively. However, in the apparatus 30 shown, the article 10 is secured against the register surface 40 by an external device, such as the securing arm 54 shown in FIG. 7. For example, a separate machine can be used to transfer the article 10 to the apparatus 30. The machine then extends its arm 54 toward the register surface 40 to secure the article 10 against the register surface 40.

Figure 5:
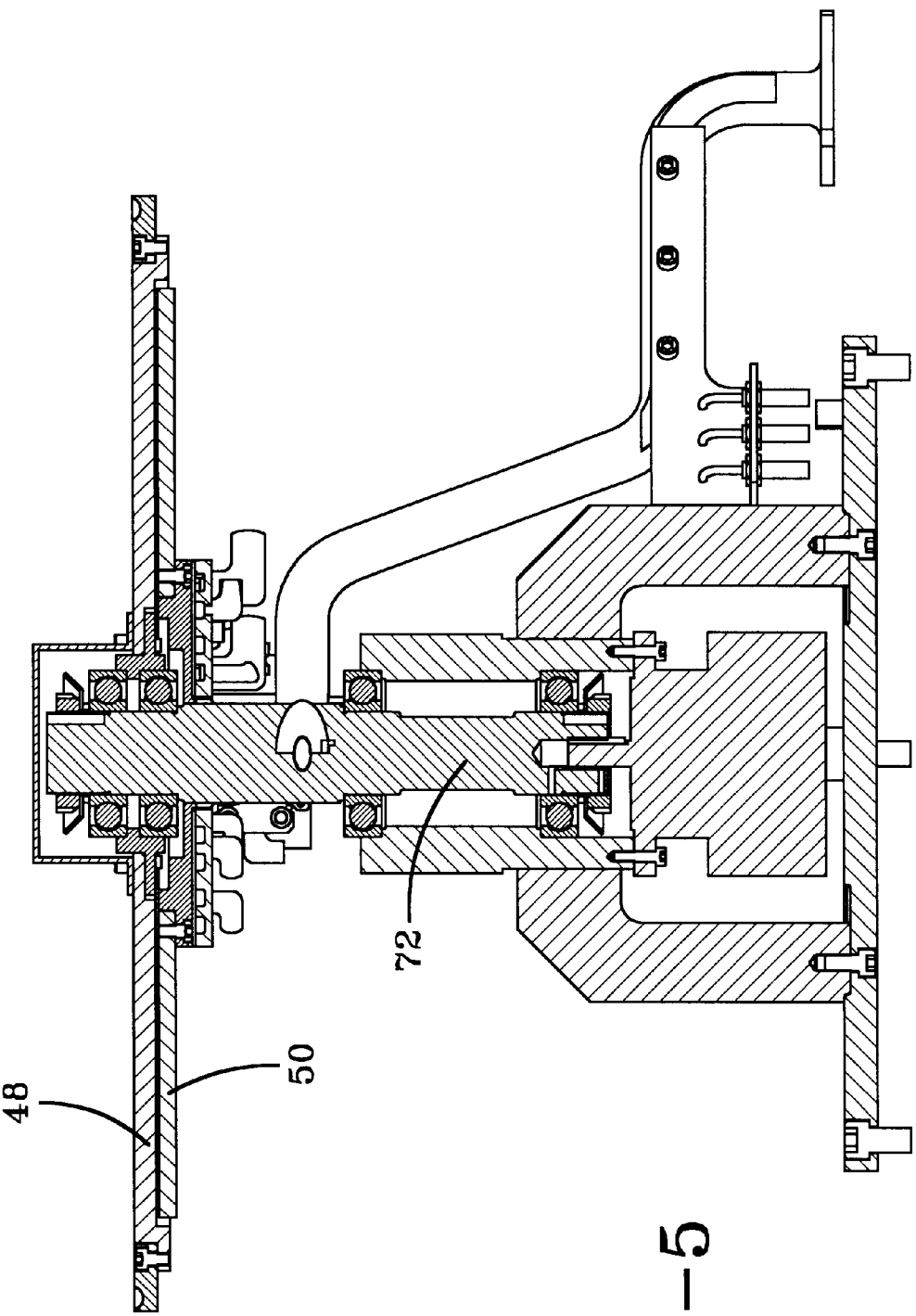
FIG. 5 is a side view of the second tooling assembly of the apparatus shown in FIG. 2.
Figure 7:
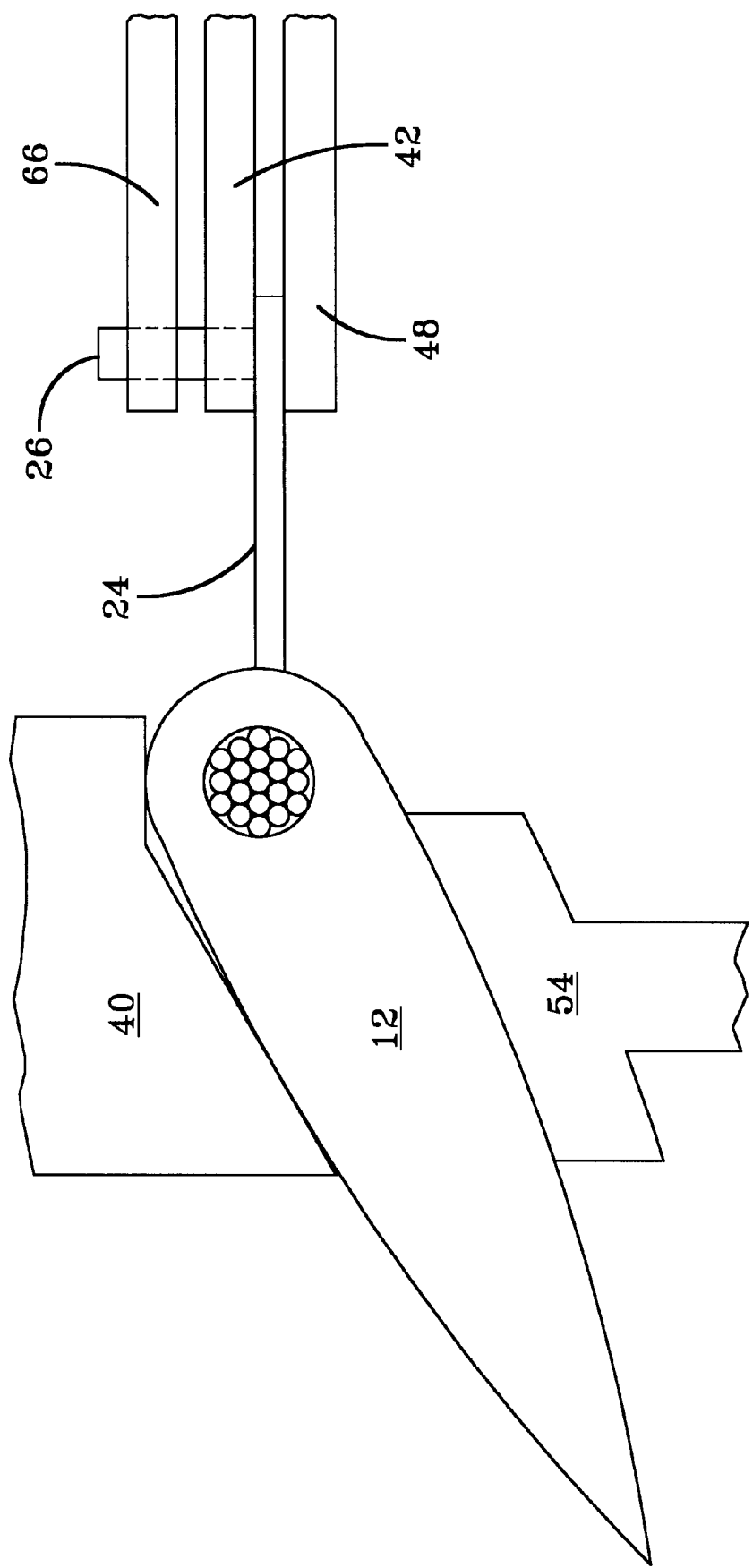
FIG. 7 is a cut-away view of the first and second mechanisms of the apparatus securing at least a portion of the article and the waste material.

FIG. 5 shows a detailed side view of the second tooling assembly 34. In this embodiment, the second tooling assembly 34 contains the remaining portion of the second mechanism, the second clamp plate 48. The second clamp plate 48 moves toward and away from the first clamp plate 42. When at least a portion of the article 10 is properly secured, such that the waste material bridges the open space 44 and at least partially overlaps the first clamp plate 42, the second clamp plate 48 moves toward the first clamp plate 42 to secure at least a portion of the waste material. FIG. 7 shows a tire bead apex assembly 12 having a gate 24. The tire bead apex assembly 12 is at least partially secured between the register surface 40 and the securing arm 54. At least a portion of the gate 24 becomes secured when it is compressed between the first clamp plate 42 and the second clamp plate 48. After the gate 24 is secured, the second clamp plate 48 continues to move toward the first clamp plate 42 moving both toward the cylinder 46 of the first tooling assembly 32. This action stretches the gate 24 until the cylinder 46 provides sufficient resistance to stop the movement. As a result, the gate is stretched up to three quarters of an inch, 19.05 mm. The amount of stretch can be adjusted by adjusting the resistance of the cylinder 46. In the preferred method, the waste material should be stretched a distance sufficient to simultaneously apply some degree of tension to the unsecured portions of the waste material. The unsecured portions of the waste material are those portions not being secured or compressed by the second mechanism. Ideally, stretching the unsecured portions of the waste material is performed by securing at least a portion of the waste material around all 360 degrees of the annular article 10 and causing uniform stretching to the waste material. To apply some degree of tension, the waste material will typically need to be secured in at least three positions, two of which are separated by more than 180 degrees. Additionally, the stretching of the waste material should be limited to prevent tearing after penetration of the waste material by the cutting tool 52.

As shown in FIG. 5, the second tooling assembly 34 has a tooling plate 50 located directly under the second clamp plate 48. Each cutting tool 52 is attached to the tooling plate 50. The apparatus 30 can have a single cutting tool 52 or multiple cutting tools 52. For removing waste material from an annular article 10, the ideal shape of the tooling plate 50 is circular and the plate is rotated about a central shaft 72 that aligns with the central axis of the annular, elastomeric article 10. This rotation imparts a circumferential force to move the cutting tool 52 through the waste material completely around the annular article 10.

Figure 6:
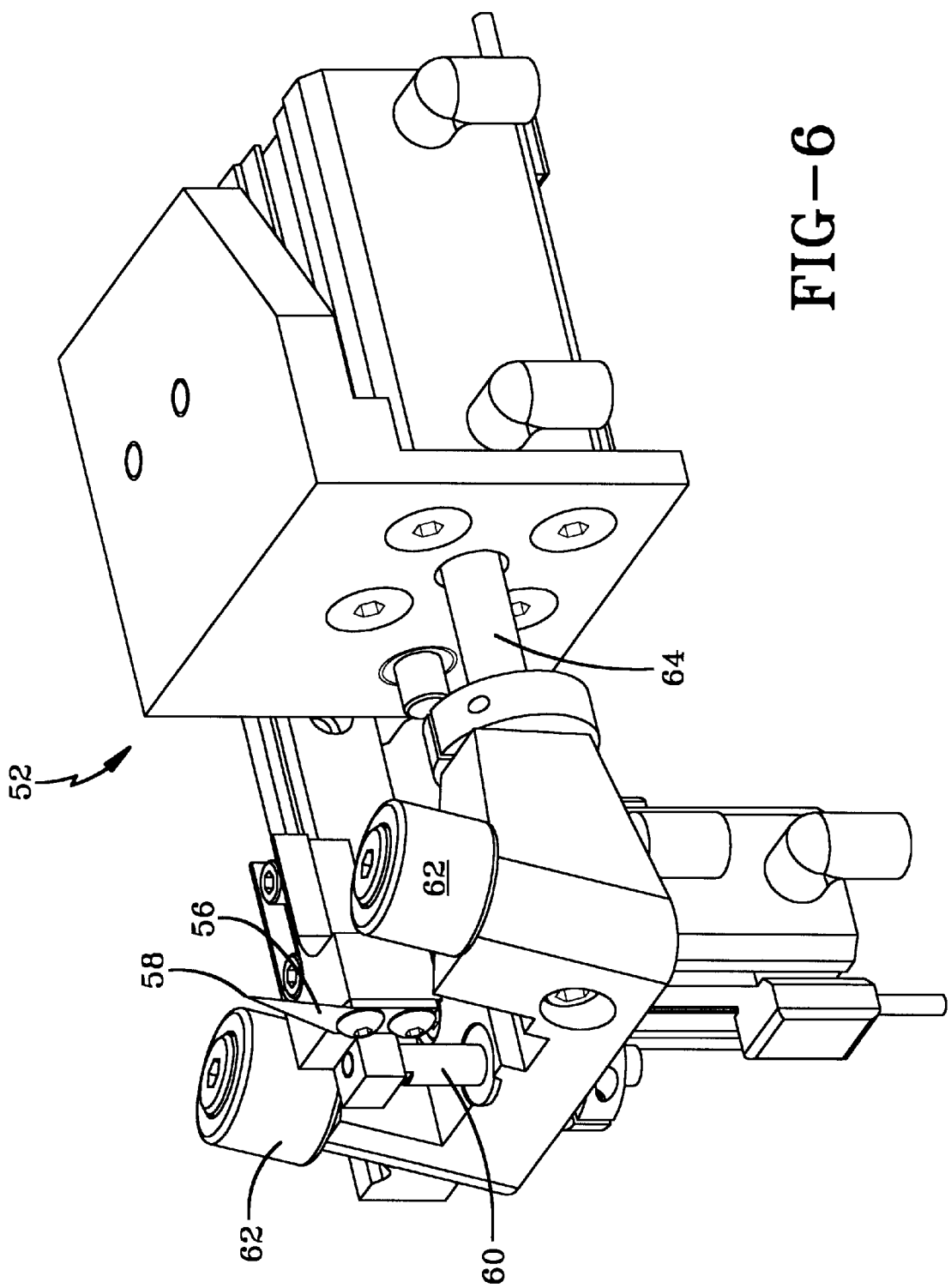
FIG. 6 is a view of a cutting tool for the apparatus shown in FIG. 2.

FIG. 6 shows a view an embodiment of a cutting tool 52. This cutting tool 52 has a blade 56 with a sharp point 58. A laser, a water-jet, or any other alternative can be used in place of the blade 56. The cutting tool 52 also has a penetrating mechanism 60 used to penetrate the waste material. The penetrating mechanism 60 shown is a pneumatic cylinder but other like mechanisms may be used. The cutting tool 52 also has a positioning device 62 for properly positioning the blade 56. The positioning device 62 shown is a pair of rollers. An extending mechanism 64 extends until the positioning device 62 contacts the article 10. The blade 56 is positioned a predetermined distance from the positioning device 62 so that it will be properly positioned to penetrate the waste material when the positioning device is in contact with the article 10. After properly positioning the cutting tool 52, the penetrating mechanism 60 forces at least the sharp point 58 of the blade 56 completely through the waste material. If a laser or a water-jet is used, the penetrating mechanism 60 is not necessary. After fully penetrating the waste material, the cutting tool 52 is guided along the edge 28 of the article 10 until the waste material is removed. The guiding is done by applying a radial force to the cutting tool 52 to ensure contact between a positioning device 62 and the article 10, and by applying a circumferential force to the cutting tool 52 to move it through the waste material. After removal of the waste material, the first mechanism releases the article 10 and the article 10 is transferred away from the apparatus 30. The second mechanism may also be released and the waste material disposed of manually or automatically.

Figure 4:
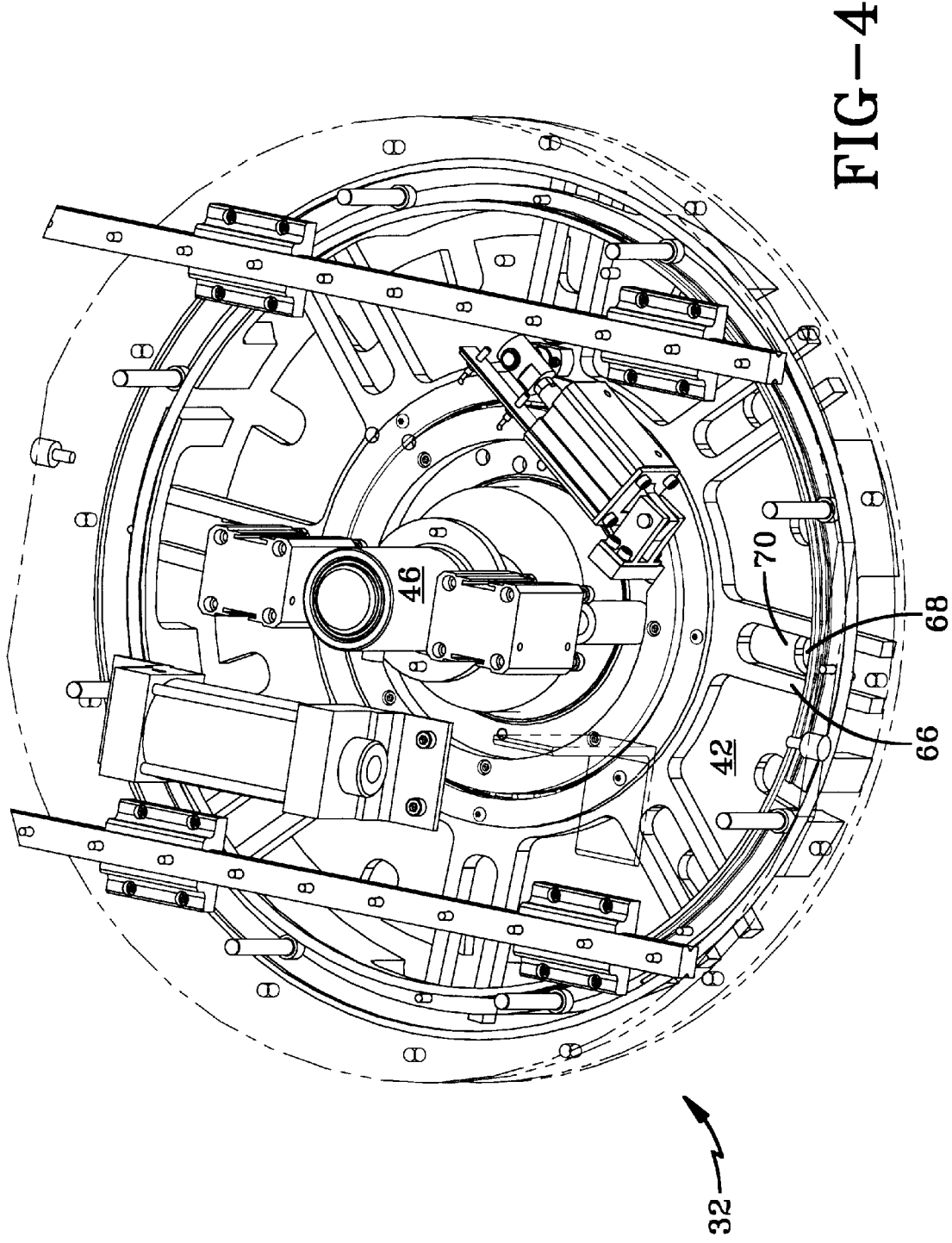
FIG. 4 is a top view of the first tooling assembly of the apparatus shown in FIG. 2.

The first tooling assembly 32 can be used to automatically dispose of the waste material if the waste material contains sprues 26, such as a gate 24 of a tire bead apex assembly 12. As shown in FIG. 4, the first tooling assembly 32 may have a locking plate 66 located directly above the first clamp plate 42. In this embodiment of the assembly 30, the first clamp plate 42 has a plurality of holes 68, each located to accept a respective sprue 26. The locking plate 66 has a plurality of openings 70 which correspond with some of the holes 68 in the first clamp plate 42. When the waste material with sprues 26 is placed against the first clamp plate 42, each sprue 26 is received by both a respective hole 68 in the first clamp plate 42 and a respective opening 70 in the locking plate 66. The locking plate 66 rotates to lock each sprue 26 between a surface forming each hole 68 and a surface forming each opening 70. After the waste material is removed from the article 10, the first mechanism is released and the article 10 is removed. The second tooling assembly 34 retracts away from the first tooling assembly 32. At this time, the removed waste material is attached to the first tooling assembly 32 by the locked sprues 26. The first tooling assembly 32 is shuttled on the rail 38 out a side of the apparatus 30 to the position above a disposal area. The locking plate 66 is moved back to its original position to release the sprues 26 and the removed waste material is dropped into the disposal area. If the entire second mechanism is located on the first tooling assembly 32, there is no need for a locking plate 66 or for sprues 26 as the second mechanism can secure the waste material until the first tooling assembly 32 has shuttled to the position above the disposal area. After the removed waste material is dropped from the first tooling assembly 32, the first tooling assembly 32 resets to its original position to accept another article 10.

The method of removing waste material from an annular, elastomeric article 10 includes the steps of: securing at least a portion of the article 10; securing at least a portion of the waste material; penetrating the waste material with a cutting tool 52; guiding the cutting tool 52 through the waste material; and stretching the waste material prior to guiding the cutting tool 52. In the preferred method, the waste material is simultaneously stretched in at least three locations. When the waste material is stretched, the material is stretched a distance sufficient to simultaneously apply a tension to portions of the waste material between the stretching locations. However, the amount of stretch of the waste material is limited to prevent tearing of the waste material after penetration with the cutting tool 52. The step of penetrating the waste material with the cutting tool 52 may include properly positioning the cutting tool 52 and applying a force to push at least a portion of the cutting tool 52 completely through the waste material. To aid in properly positioning the cutting tool 52, the cutting tool 52 has a positioning device 62 that is located a predetermined distance from the blade 56 of the cutting tool 52. The cutting tool 52 is extended toward the article 10 until the positioning device 62 contacts the article 10. The cutting tool 52 may be guided through the waste material by applying a radial force to ensure continuous contact between the positioning device 62 and the article 10, and applying a circumferential force to the cutting tool 52 to move it through the waste material.

What is claimed is:

1. A method for removing waste material from an annular, elastomeric article (10), the waste material having been formed simultaneously with the elastomeric article, the method comprising the steps of:

(i) securing at least a portion of the article (10) with a positioning device;

(ii) securing at least a portion of the waste material;

(iii) stretching the waste material;

(iv) penetrating the waste material with a cutting tool (52);

(v) guiding the cutting tool (52) through the waste material while applying a circumferential force, relative to the annular article, to the cutting tool (52) to move it through the waste material.

2. A method as in claim 1, the step of stretching the waste material further comprising the step of:

stretching the waste material a distance sufficient to simultaneously apply some degree of tension to the unsecured portions of the waste material.

3. A method as in claim 1, the step of guiding the cutting tool (52) further comprising the step of applying a radial force, relative to the annular article, to ensure continuous contact between the positioning device (62) and the article (10).

* * * * *